US009970309B2

United States Patent
Klusáček

(10) Patent No.: US 9,970,309 B2
(45) Date of Patent: May 15, 2018

(54) METHOD FOR PRODUCING A ROTOR OF A CHARGING APPARATUS

(71) Applicant: Bosch Mahle Turbo Systems GmbH & Co. KG, Stuttgart (DE)

(72) Inventor: Michal Klusáček, Praha (CZ)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 358 days.

(21) Appl. No.: 14/817,898

(22) Filed: Aug. 4, 2015

(65) Prior Publication Data
US 2016/0040545 A1    Feb. 11, 2016

(30) Foreign Application Priority Data

Aug. 5, 2014 (DE) .................. 10 2014 215 441

(51) Int. Cl.
*F01D 11/02* (2006.01)
*B23P 13/02* (2006.01)
(Continued)

(52) U.S. Cl.
CPC ............. *F01D 11/02* (2013.01); *B23P 13/02* (2013.01); *B23P 15/006* (2013.01); *F01D 5/02* (2013.01);
(Continued)

(58) Field of Classification Search
CPC .......... Y10T 29/49316; Y10T 29/4932; Y10T 29/49327; Y10T 29/49861; F01D 5/02;
(Continued)

(56) References Cited

U.S. PATENT DOCUMENTS 3,664,001 A * 5/1972 Pilarczyk ............ F04D 29/4206
29/888.021
4,268,231 A * 5/1981 Corwin .................... F01C 11/00
418/151
(Continued)

FOREIGN PATENT DOCUMENTS

DE    102004044070 B3    1/2006
DE    102008062553 A1    6/2010
(Continued)

OTHER PUBLICATIONS

Chinese Office Action dated Jun. 28, 2017 relating to corresponding Chinese Patent Application No. 201510404148.6 with English translation.
(Continued)

*Primary Examiner* — Jason L Vaughan
(74) *Attorney, Agent, or Firm* — Fishman Stewart PLLC

(57) ABSTRACT

A method of producing a rotor of a charging apparatus may include the steps of providing at least one compressor wheel and a turbine wheel. The compressor wheel and the turbine wheel may each include a bearing section having a radial bearing surface at a longitudinal end for mounting a bearing housing. At least one of the radial bearing surfaces may include a radial oversizing corresponding to a rotationally asymmetric geometry between at least the bearing section of the compressor wheel and the bearing section of the turbine wheel. The method may include the step of assembling the compressor wheel, the turbine wheel and each bearing section together to form a unitary structure, and machining the at least one of the radial bearing surfaces to reduce the respective radial oversizing until each of the radial bearing surfaces are rotationally symmetrical with respect to each other.

17 Claims, 1 Drawing Sheet

(51) Int. Cl.
  *B23P 15/00* (2006.01)
  *F01D 5/02* (2006.01)
  *F01D 25/16* (2006.01)
  *F01D 25/28* (2006.01)
  *F02B 37/00* (2006.01)
  *F01D 5/06* (2006.01)

(52) U.S. Cl.
  CPC ............. *F01D 5/027* (2013.01); *F01D 5/063* (2013.01); *F01D 25/16* (2013.01); *F01D 25/28* (2013.01); *F02B 37/00* (2013.01); *F05D 2220/40* (2013.01); *F05D 2230/61* (2013.01); *F05D 2240/24* (2013.01); *F05D 2240/54* (2013.01); *F05D 2240/55* (2013.01)

(58) Field of Classification Search
  CPC .......... F01D 5/063; F01D 5/027; F01D 11/02; F01D 25/16; F01D 25/28; F02B 37/00; F05D 2220/40; F05D 2230/61; F05D 2240/24; F05D 2240/54; F05D 2240/55
  See application file for complete search history.

(56) References Cited

U.S. PATENT DOCUMENTS

| | | | | |
|---|---|---|---|---|
| 4,501,095 A * | 2/1985 | Drinkuth | ................ | B24B 19/14 29/889.2 |
| 4,693,669 A * | 9/1987 | Rogers, Sr. | ........... | F04D 17/025 415/122.1 |
| 5,310,311 A * | 5/1994 | Andres | ................. | B64D 13/06 310/90.5 |
| 6,305,169 B1 * | 10/2001 | Mallof | ................... | F01D 15/10 60/608 |
| 6,914,360 B2 * | 7/2005 | Bosen | ................. | F01D 25/16 310/261.1 |
| 7,451,543 B2 * | 11/2008 | Stewart | ................ | F04D 29/059 29/432.1 |
| 8,801,379 B2 * | 8/2014 | Allen | .................... | F04D 29/266 416/144 |
| 9,394,791 B2 * | 7/2016 | Klusacek | ................ | F01D 5/048 |
| 9,638,138 B2 * | 5/2017 | Annati | .................. | F02M 26/04 |
| 9,752,536 B2 * | 9/2017 | Annati | .................. | F02M 26/04 |
| 2006/0057007 A1 | 3/2006 | Bumbel et al. | | |
| 2012/0093650 A1 | 4/2012 | Huber et al. | | |
| 2013/0209267 A1 | 8/2013 | Klusacek | | |
| 2014/0134926 A1 | 5/2014 | Groppe et al. | | |
| 2014/0373354 A1 | 12/2014 | Henker et al. | | |

FOREIGN PATENT DOCUMENTS

| | | |
|---|---|---|
| DE | 102009014005 A1 | 9/2010 |
| DE | 102009002418 A1 | 10/2010 |
| DE | 102012002284 A1 | 8/2013 |
| DE | 102012202272 A1 | 8/2013 |
| EP | 2730370 A1 | 5/2014 |
| WO | WO-2014016016 A1 | 1/2014 |

OTHER PUBLICATIONS

H. Horler et al., 涡轮增压器的外置式轴承和内置式轴承 (Turbocharger External Bearings and Built-In Bearings), Dec. 31, 1982, China.

宫志国等 (G. Zhiguo et al.), 涡轮增压器转子动平衡技术研究 (Research on Turbocharger Rotor Balancing Technology), Dec. 31, 2005, China.
Extended European Search Report for App. No. EP15175069 dated Dec. 8, 2015.
English Abstract for DE102009014005A1.
English Abstract for DE102008062553A1.
English Abstract for WO2014016016A1.
German Search Repot fo DE-102014215441.3, dated Apr. 3, 2015.

* cited by examiner

METHOD FOR PRODUCING A ROTOR OF A CHARGING APPARATUS

CROSS-REFERENCE TO RELATED APPLICATIONS

This application claims priority to German Patent Application No. 10 2014 215 441.3, filed Aug. 5, 2014, the contents of which are hereby incorporated by reference in its entirety.

TECHNICAL FIELD

The present invention relates to a method for producing a rotor of a charging apparatus, particularly an exhaust turbocharger, with a compressor wheel and a turbine wheel. The invention additionally relates to a rotor produced according to this method, and also a charging apparatus with a rotor of this type.

BACKGROUND

Rotors for exhaust turbochargers or for charging apparatuses in general are conventionally composed of a plurality of parts, for example a turbine wheel, a shaft and a compressor wheel. The individual parts are in this case assembled separately with rotationally symmetrical end contours. After the assembly, the pre-balanced individual parts, for example the compressor wheel and the turbine wheel, are mounted to form the rotor. After final installation, the rotor is balanced again.

However, it is disadvantageous in the known assembly method that the individual rotor parts must be balanced separately here and after installation, in spite of everything, no exactly rotationally symmetrical surfaces are present on the rotor.

SUMMARY

The present invention is therefore concerned with the problem of specifying an improved or at least alternative embodiment for a method of the generic type, by means of which a comparatively simple and nonetheless highly precise production of a balanced rotor with rotationally symmetrical surfaces is possible.

This problem is solved according to the invention by the subject matter of the independent claims. Advantageous embodiments are the subject matter of the dependent claims.

The present invention is based on the general idea of assembling individual parts of a rotor, for example a turbine wheel and a compressor wheel or bearing sections with radial oversizing, subsequently of assembling to form a rotor, and of machining, for example turning or grinding, the same in the finally assembled state, until it is rotationally symmetrical. The advantages in the method according to the invention lie in particular in the fact that the individual rotor parts, that is to say for example, the compressor wheel or the turbine wheel or the bearing sections, do not have to be balanced separately, and in addition, all important surfaces are assembled from one clamping, that is to say in a clamped work step, as a result of which a maximum concentricity can be ensured for simultaneously minimal costs.

In an advantageous development of the method according to the invention, the turbine wheel is connected to the compressor wheel via a labyrinth seal, wherein another bearing section for mounting the rotor in a bearing housing of the charging apparatus is provided in each case at the longitudinal end. Subsequently, the fully assembled rotor made up of bearing sections, turbine wheel, labyrinth seal and compressor wheel is machined, particularly turned or ground, for example on a lathe or in a centreless manner, until it is rotationally symmetrical. Not only the rotationally symmetrical machining of the turbine wheel and the compressor wheel, but rather also the labyrinth seal or the two bearing sections, are hereby possible.

At least two components of the rotor, for example the compressor wheel, the turbine wheel, a bearing section or the labyrinth seal are expediently welded, soldered, screwed or adhesively bonded to one another. Even this non-exhaustive list makes it possible to deduce which manifold possibilities of the connection of the individual parts of the rotor are possible, so that the same can be connected to one another for example in a non-positive-fitting, positive-fitting and/or materially-connected manner.

According to a further advantageous embodiment of the solution according to the invention, the axial end faces of the bearing sections are machined by means of eroding processes or by means of grinding processes. Turning of the rotor can in this case be carried out in particular on the axial end faces of the bearing sections only up to a centring hole, as the rotor is clamped into a spindle of the lathe in the region of the centring hole and as a result, cannot be machined there. The non-machinable region of the centring therefore cannot be machined "from one clamping" and is therefore eroded away or reground after the removal of the rotor from the lathe. Thus, using the method according to the invention, it is possible to machine all surface regions of the rotor up to the centring holes, as a result of which the same can be produced optimally with regards to the rotational symmetry thereof, which of course also has a positive effect on an imbalance that may be present under certain circumstances. The installation of the rotor into the charging apparatus is also simplified by this.

According to a further advantageous embodiment of the solution according to the invention, an axial air bearing is etched or eroded into the axial end faces. An air bearing of this type offers a particularly low friction and at the same time wear-free bearing, wherein the air guide grooves required for this can be produced in-expensively, but nonetheless highly precisely by means of etching or erosion processes or else by means of a laser process.

Further important features and advantages of the invention result from the sub-claims, from the drawings and from the associated description of the figures on the basis of the drawings.

It is to be understood that the previously mentioned features and the features which are still to be mentioned in the following, can be used not only in the respectively specified combination, but also in other combinations or alone, without departing from the context of the present invention.

Preferred exemplary embodiments of the invention are illustrated in the drawings and are described in more detail in the following description, wherein identical reference numbers refer to identical or similar or functionally identical components.

BRIEF DESCRIPTION OF THE DRAWINGS

In the figures, in each case schematically.

DETAILED DESCRIPTION

Figure 1:
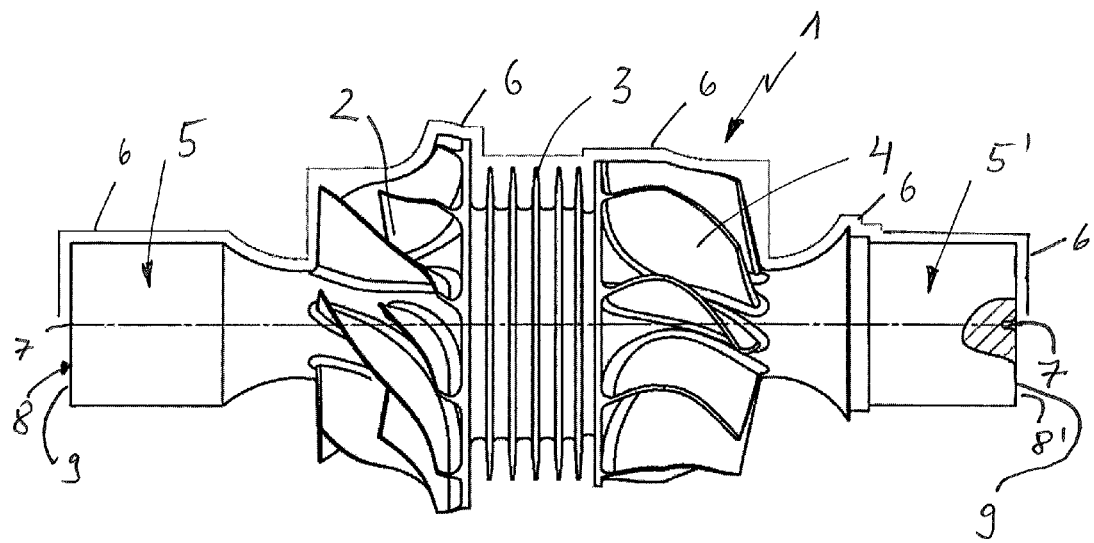
FIG. 1 shows a rotor according to the invention in a side view.

A rotor 1 produced according to the invention of a charging apparatus not shown otherwise is illustrated according to FIG. 1, with a compressor wheel 2, a labyrinth seal 3 and a turbine wheel 4. Another bearing section with radial bearing surfaces 5 or 5' is furthermore arranged at the longitudinal end on the compressor wheel 2 or in the turbine wheel 4 in each case. The individual components of the rotor 1, that is to say for example the turbine wheel 2, the labyrinth seal 3, the compressor wheel 4 and also the bearing sections can in this case be connected non-positively, in a material-connected manner or positively to one another, particularly adhesively bonded, screwed, welded or soldered to one another.

In addition to the outer radial bearing surfaces 5, 5', which are preferably constructed as radial air bearings and take on the radial mounting of the rotor 1, an axial air bearing can be arranged in the region of the bearing sections, so that the entire rotor 1 is preferably air mounted both in the radial direction and in the axial direction.

According to the invention, the rotor 1 is then produced in that at least the radial bearing surfaces 5, 5' are assembled with radial oversizing and are subsequently connected to one another with the compressor wheel 2 and with the turbine wheel 4 to form the rotor 1. Preferably, the compressor wheel 2 and the turbine wheel 4 and the labyrinth seal 3 are likewise assembled with radial oversizing. In this case, instead of the labyrinth seal 3, a shaft can of course be provided, which connects the compressor wheel 2 to the turbine wheel 4. Subsequently, the fully assembled rotor 1 is clamped into a lathe and machined, particularly turned or ground, until it is rotationally symmetrical. The term "lathe" should in this case represent a place holder for machining equipment, which of course not only enable turning, but also grinding or some other machining of the surfaces of the rotor 1 with regards to an optimised rotational symmetry.

In particular, centreless machining can also take place instead of clamping into a lathe. Here, the workpiece is not clamped between headstock and tailstock, but rather guided between grinding and regulating wheels and in this case held from below by means of a rail. A distinction is made between plunge grinding and continuous grinding. Very high throughputs can be achieved in the latter method.

Centreless shoe grinding machines are a special version, in which the bearing rail and regulating wheel are replaced with steel shoes. Thus, special geometries can be ground in one work step.

In the illustration of the rotor 1 shown according to FIG. 1, all components of the rotor 1, that is to say therefore, the bearing section with the radial bearing surface 5, the compressor wheel 2, the labyrinth seal 3, the turbine wheel 4 and also the bearing section with radial bearing surface 5' are initially connected to one another to form the rotor 1 and the same is subsequently clamped into the lathe in particular in the final assembled state and postmachined there. With the postmachining in "one clamping", one achieves an optimal concentricity of all surfaces of the individual components of the rotor 1, which reduces the imbalance and simplifies the installation of the rotor 1 in the charging apparatus. Alternatively, instead of clamping into a lathe, centreless machining can also take place, wherein the workpiece is not clamped between headstock and tailstock, but rather is guided between grinding and regulating wheels and held from below by means of a rail. The possible surfaces of the rotor 1, which are post-machined in the method according to the invention, are labelled in FIG. 1 with the line 6. It is therefore possible to post-machine virtually the entire rotor 1 with the exception of a small region in the region of the centring holes 7 and in the process to optimise the same with regards to rotational symmetry. It would however also be possible to machine the outer radial bearing surfaces 5, 5' of the rotor 1 in one clamping.

The regions around the centring holes 7 cannot be machined in the lathe, so that these regions are ground away or eroded away after the unclamping of the rotor 1. The front edges of the compressor wheel blades and the rear edges of the turbine wheel blades are likewise not machined in one clamping.

Figure 2:
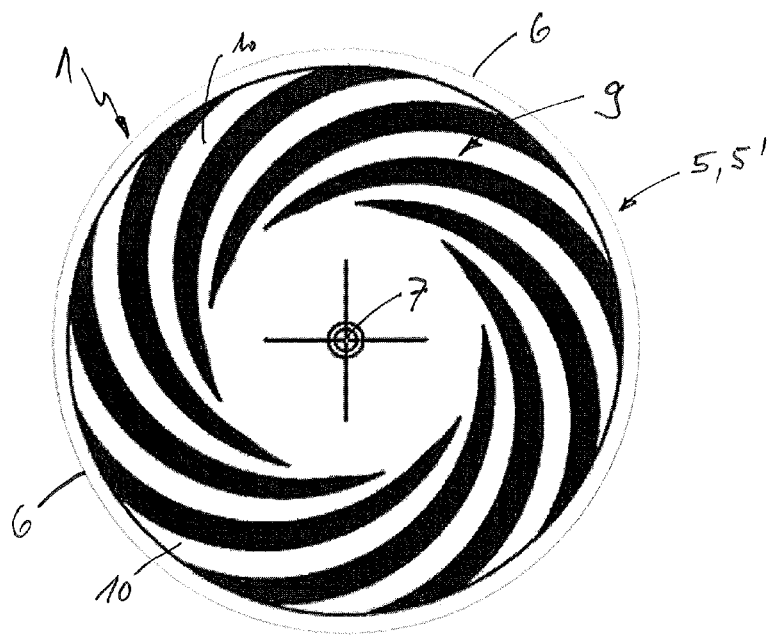
FIG. 2 shows a frontal view onto a bearing section of the rotor with an axial air bearing.

The bearing sections are in this case used for the radial mounting of the rotor 1 in a bearing housing of the charging apparatus, wherein after the machining of the rotor 1 in the lathe, the axial end faces 8, 8' of an axial air bearing 9 (compare FIG. 2) are machined by laser structuring. Of course, the grooves 10 arranged in a spiral-shaped manner forming the individual axial air bearings 9 can in this case be produced in another manner, for example by means of etching or eroding or by means of cutting methods.

It is therefore possible with the method according to the invention to no longer balance the individual rotor parts, for example the bearing sections, the compressor wheel 2, the labyrinth seal 3 and the turbine wheel 4 separately, as a result of which the production costs can be reduced considerably. Furthermore, with the method according to the invention, all important surfaces are produced from "one clamping", as a result of which a maximum concentration and a maximum rotational symmetry can be achieved for simultaneously minimal costs.

The invention claimed is:

1. A method for producing a rotor of a charging apparatus, comprising the steps of:
    providing at least one compressor wheel and a turbine wheel, wherein the compressor wheel and the turbine wheel each include a bearing section having a radial bearing surface at a longitudinal end for mounting a bearing housing wherein at least one of the radial bearing surfaces includes a radial oversizing corresponding to a rotationally asymmetric geometry between at least the bearing section of the compressor wheel and the bearing section of the turbine wheel,
    assembling the compressor wheel, the turbine wheel and each bearing sections together to form a unitary structure, and
    machining the at least one of the radial bearing surfaces to reduce the respective radial oversizing until each of the radial bearing surfaces are rotationally symmetrical with respect to each other.

2. The method according to claim 1, wherein the step of assembling the compressor wheel, the turbine wheel and each bearing section together further includes connecting the turbine wheel to the compressor wheel via a labyrinth seal, and
    machining each of the bearing sections, the turbine wheel, the labyrinth seal and the compressor wheel until the unitary structure is rotationally symmetrical.

3. The method according to claim 1, wherein the step of assembling the compressor wheel, the turbine wheel and each bearing section together further includes connecting a labyrinth seal to at least one of the compressor wheel and the turbine wheel via at least one of welding, soldering, adhesively bonding or and screwing to one another.

4. The method according to claim 1, wherein each of the bearing sections have an axial end face, and at least one axial end face includes a radial oversizing, and the step of machining the at least one of the radial bearing surfaces further includes machining the at least one axial end face to reduce the respective radial oversizing until each of the radial bearing surfaces are rotationally symmetrical and each of the axial end faces are perpendicular to the respective radial bearing surfaces.

5. The method according to claim 4, further comprising the step of forming an axial air bearing into at least one of the axial end faces via at least one of etching, eroding and machining.

6. The method according to claim 5, wherein the step of forming an axial air bearing into at least one of the axial end faces balances the unitary structure.

7. The method according to claim 1, wherein each radial bearing surface includes an axial end face, and the step of machining at least one of the radial bearing surfaces includes machining each of the radial bearing surfaces and each axial end face in at least one of a lathe and a centreless manner until each of the radial bearing surfaces are rotationally symmetrical and each of the axial end faces are perpendicular to the respective radial bearing surfaces.

8. The method according to claim 1, wherein the step of machining the at least one of the radial bearing surfaces includes turning and grinding until each of the radial bearing surfaces are rotationally symmetrical with respect to each other.

9. The method according to claim 1, wherein the compressor wheel, the turbine wheel and each bearing section have a radial oversizing corresponding to a rotationally asymmetric geometry with respect to each other, and the step of machining further includes at least one of turning and grinding each of the compressor wheel, the turbine wheel and each bearing section to reduce the respective radial oversizing until the unitary structure is rotationally symmetrical.

10. A method for producing a rotor of an exhaust gas turbocharger, comprising the steps of:

providing a compressor wheel and a turbine wheel, the compressor wheel having a first bearing section at a first longitudinal end and the turbine wheel having a second bearing section at a second longitudinal end, wherein at least one of the first bearing section and the second bearing section defines a radial oversizing relative to a predefined radial extent less than the radial oversizing;

connecting the compressor wheel to the turbine wheel via a labyrinth seal to form a unitary structure having a rotation axis; and machining the at least one of the first bearing section and the second bearing section to reduce the respective radial oversizing to the respective predefined radial extent and define a first bearing surface associated with the first bearing section that is rotationally symmetrical to a second bearing surface associated with the second bearing section.

11. The method according to claim 10, wherein the step of connecting the compressor wheel to the turbine wheel via a labyrinth seal further includes at least one of welding, soldering, adhering and screwing the labyrinth seal to at least one of the compressor wheel and the turbine wheel.

12. The method according to claim 10, wherein the turbine wheel, the compressor wheel and the labyrinth seal each define a respective radial oversizing relative to a respective predefined radial extent less than the respective radial oversizing; and wherein the step of machining the at least one of the first bearing section and the second bearing section further includes machining each of the turbine wheel, the compressor wheel and the labyrinth seal to reduce the respective radial oversizing to the respective predefined radial extent.

13. The method according to claim 10, wherein the first bearing section has a first axial end face and the second bearing section has a second axial end face, wherein at least one of the first axial end face and the second axial end face includes a radial oversizing; and wherein the step of machining the at least one of the first bearing section and the second bearing section further includes machining the at least one of the first axial end face and the second axial end face to reduce the respective radial oversizing until each of the first radial bearing surface and the second radial bearing surface are rotationally symmetrical to one another and each of the first axial end face and the second axial end face extend perpendicular to the associated first bearing surface and the second bearing surface.

14. The method according to claim 13, further comprising forming an axial air bearing into at least one of the first axial end face and the second axial end face via at least one of etching, eroding and machining.

15. The method according to claim 14, wherein the respective axial air bearing balances the first bearing section with respect to the second bearing section.

16. The method according to claim 10, further comprising forming an axial air bearing into at least one of the first longitudinal end of the first bearing section and the second longitudinal end of the second bearing section, wherein the respective axial air bearing is formed via at least one of etching, eroding and machining.

17. The method according to claim 10, wherein the step of machining the at last one of the first bearing section and the second bearing section includes machining each of the first bearing section and the second bearing section in at least one of a lathe and a centreless manner to reduce the respective radial oversizing to the respective predefined radial extent and define a first bearing surface associated with the first bearing section that is rotationally symmetrical to a second bearing surface associated with the second bearing section.

* * * * *